Feb. 14, 1950  T. J. YOUNG ET AL  2,497,385
HINGED SWEEP OR BASKET FOR TRACTOR ATTACHMENTS
Filed Jan. 26, 1948  2 Sheets-Sheet 1
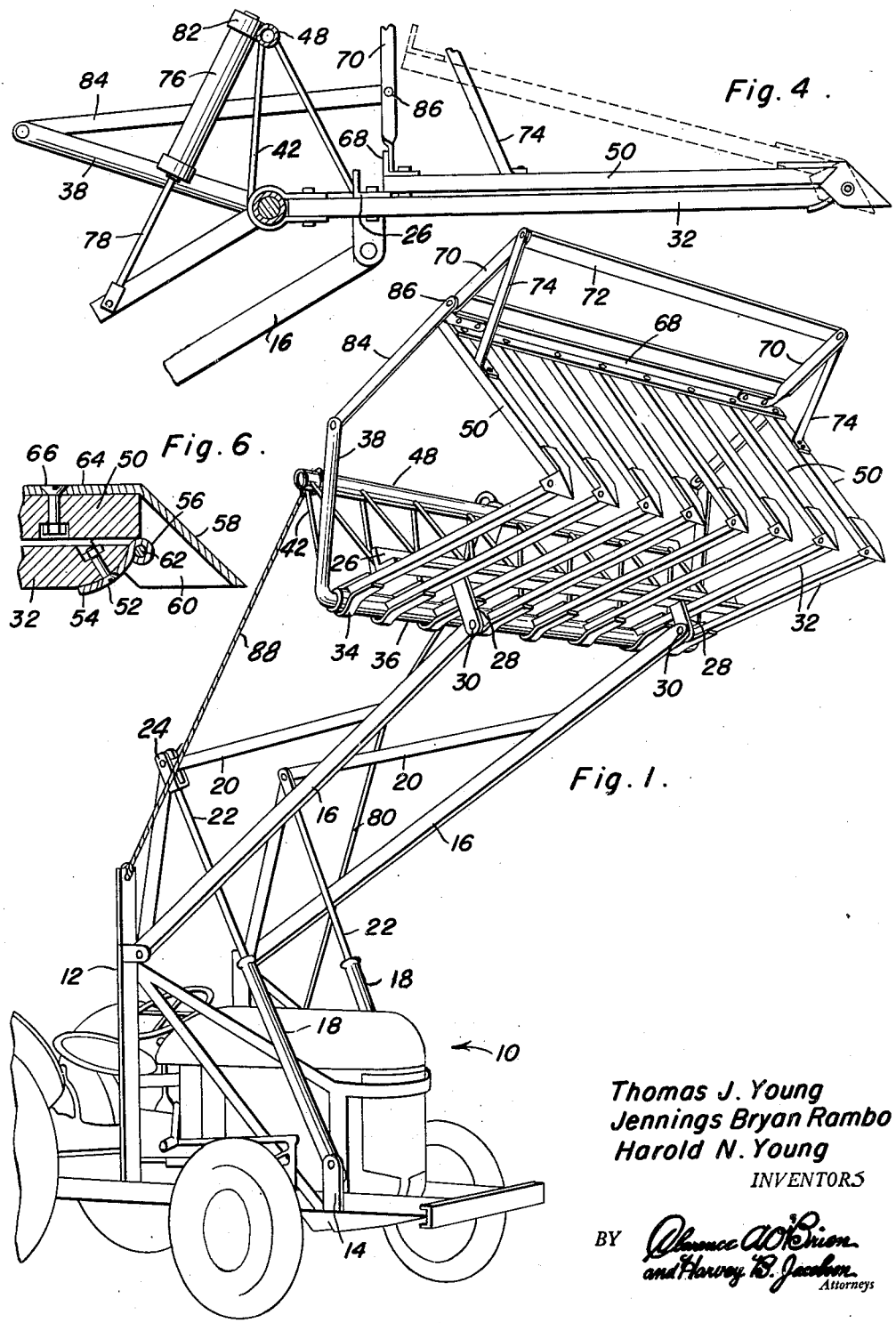
Thomas J. Young
Jennings Bryan Rambo
Harold N. Young
INVENTORS Feb. 14, 1950 T. J. YOUNG ET AL 2,497,385
HINGED SWEEP OR BASKET FOR TRACTOR ATTACHMENTS
Filed Jan. 26, 1948 2 Sheets-Sheet 2
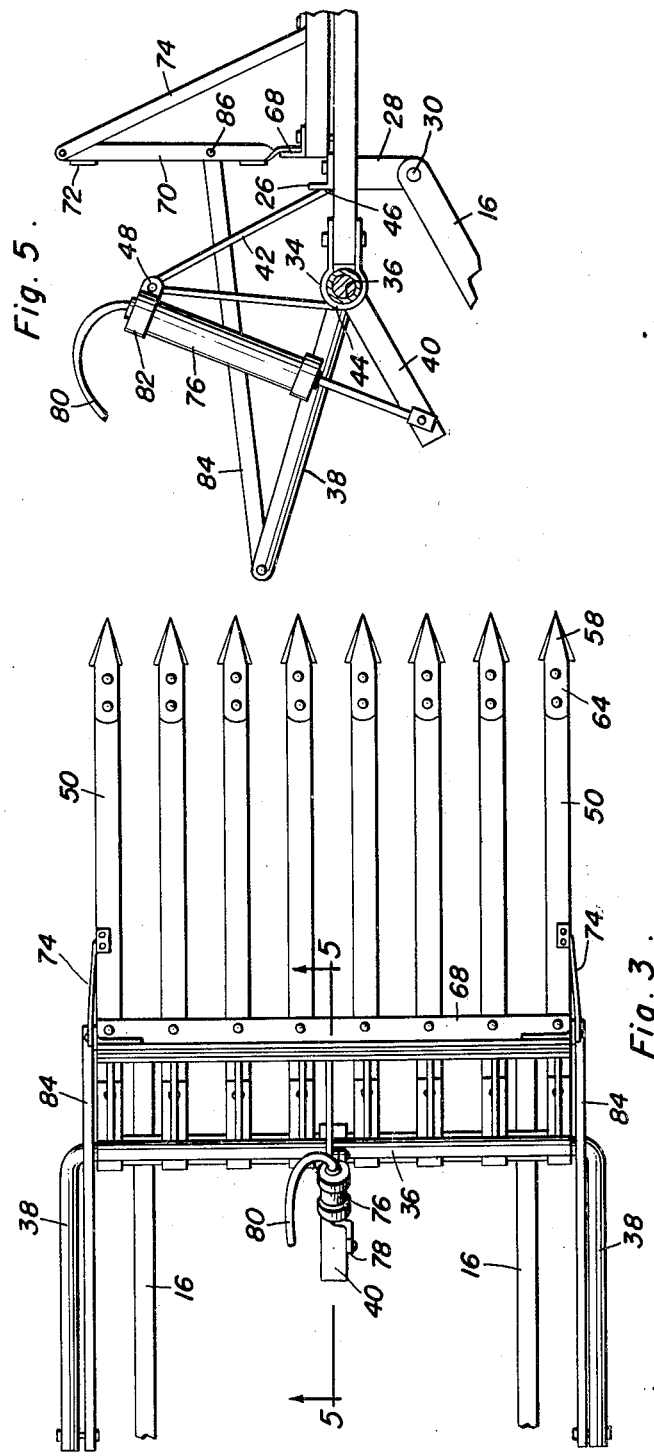
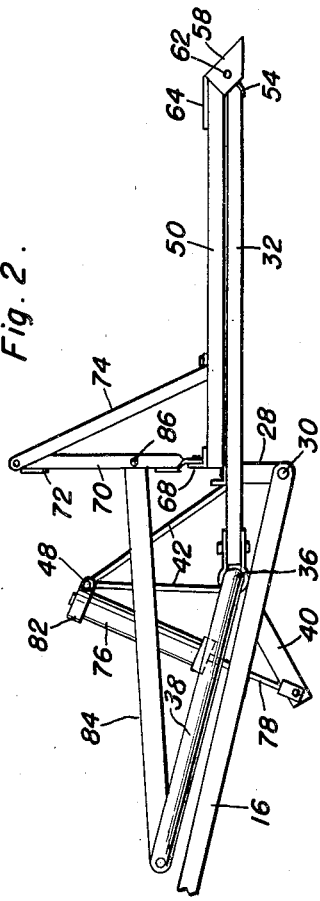
Thomas J. Young
Jenning Bryan Rambo
Harold N. Young
INVENTORS

Patented Feb. 14, 1950

2,497,385

UNITED STATES PATENT OFFICE

2,497,385

HINGED SWEEP OR BASKET FOR TRACTOR ATTACHMENTS

Thomas J. Young, Jennings Bryan Rambo, and Harold N. Young, Meridian, Idaho

Application January 26, 1948, Serial No. 4,304

1 Claim. (Cl. 214—140)

This invention relates generally to devices for handling hay and the like, and more particularly to a basket construction for sweep rakes and stackers of the type having elevating arms and power means to operate these arms, the specific improvements contemplated by this invention including a basket to be carried by said arms and having two sets of parallel spaced elongated teeth hinged at their front ends, so that the raising of the upper set of these teeth will discharge a load from the basket.

A primary object of this invention is to provide improved basket means for sweep rakes and stackers, whereby the basket is made capable of unloading material elevated therein, without the employment of auxiliary means to pull or to lift material out of the basket.

Another object of this invention is to provide an improved basket construction, in which the unloading means therefor is incorporated in such a manner that the efficiency of the basket as a gathering means is not impaired, the two sets of teeth mentioned above being hinged at their forward ends and pointed terminals being associated with the hinges in a manner facilitating the gathering of material into the basket.

Another object of this invention is to provide unloading means for a basket of this character, without unduly increasing the weight of the basket, and without making the basket bulky or cumbersome.

Still another object of this invention is to provide automatic unloading means for baskets used in sweep rakes and stackers, which will allow the unloading of material from the basket at maximum height, that is, at the limit of elevation of the sweep rake or stacker.

And a last object to be mentioned specifically is to provide means of the character mentioned above which will be relatively inexpensive and practicable to manufacture, which is extremely safe, convenient and nearly automatic in operation, and which will give generally efficient and durable service.

With these objects definitely in view, this invention resides in certain novel features of construction, combination and arrangement of elements and portions as will be described in the specification, particularly pointed out in the appended claims, and illustrated in the accompanying drawings which form a material part of this application, and in which:

Figure 1 is a three dimensional view of a tractor with a stacker incorporated therewith and having a basket of the improved construction described in this application, the basket being shown with the second set of teeth tilted upwardly relative to the first set of teeth, as in unloading of the basket;

Figure 2 is an enlarged side elevational view of the improved sweep basket, and a fragmentary portion of the arm structure of the stacker used to elevate the basket;

Figure 3 is a top plan view of the improved basket, the second set of teeth being illustrated in the same position as shown in Figure 2;

Figure 4 is a view similar to Figure 2, but showing the supporting arm means as disposed thereto when the basket is in elevated position, a second position of the second set of teeth being indicated in dash line;

Figure 5 is a vertical transverse sectional view of the basket, taken on the line 5—5 in Figure 3; and Figure 6 is an enlarged fragmentary detail view of the hinge connection and pointed terminal associated with each of the forward ends of the teeth.

Similar characters of reference designate similar or identical elements and portions throughout the specification and throughout the several views of the drawings.

Referring now to the drawings in detail, the environment wherewith this invention is adapted to be used includes a tractor generally indicated by the numeral 10 and including frame members 12 and 14 on each side of the tractor and upon which the elevating arms 16 and the lower ends of the hydraulic actuating cylinders 18 are pivoted, respectively. The arms 16 are each provided with inclined brace structure 20 and the piston rod 22 associated with each of the cylinders 18 is pivoted by means of a yoke 24 to this inclined brace structure, so that the arms 16 may be simultaneously elevated, all according to conventional practice as applied to sweep rakes and stackers.

This invention contemplates provision of a basket construction having a frame including a cross member 26 which may be of angle iron and is equipped with a pair of depending lugs 28 which are pivotally secured as indicated at 30 to the upper and forward ends of the elevating arms 16. A plurality of parallel elongated and regularly spaced teeth 32 are rigidly secured, intermediate their lengths, to the transverse member 26, heel portions of these elongated teeth 32 extending to the rear of the member 26 and each extending portion is fitted with a simple bracket 34 having an eye or bearing portion adapted to receive the bight portion 36 of a U-shaped member having an arm portions 38, and a rearwardly extending bell crank portion or arm 40.

A plurality of inverted V-shaped inflexible members 42 are terminally secured, as by welding at 44 and 46 to the bracket members 34 and the cross member 26. These V-shaped members 42 support another transverse member 48 at the upper ends of the V-shaped members, and the V-shaped members and cross member 48 comprises a back wall for the basket.

The second set of elongated parallel and similarly spaced teeth 50 are hinged at their front ends to the front ends of the teeth 32, the detailed construction of the hinge connections being illustrated in Figure 6. If reference be had to this figure it will be seen that the front ends of the teeth 32 are bored to receive attaching bolts 52 which retain bracket members 54 having eyes 56 on the extreme front ends thereof. Pointed terminal members 58 are provided with laterally depending lug portions 60 which are apertured to receive pins 62 whereby the lugs 60 are pivoted to the eyes 56. Each of the terminals 58 is provided with a rearwardly extending top plate 64 and screws 66 are used to secure this top plate 64 to the teeth 50. It should be noted that the top plate 64 is inclined to the nose portion of the terminals 58 so that these terminals may more effectively gather hay and the like when the machine is in operation.

The teeth 50 while elongated are shorter than the teeth 32 and the rear ends of these teeth 50 are connected by an angle iron 68 which carries a pair of upright members 70 and a top cross member 72. This portion of the basket also includes lateral braces 74 mounted between the upper ends of the upright members 70 and intermediate portions of the outside teeth 50.

A hydraulic cylinder 76 with a coacting piston rod 78 is operatively connected to a source of power carried on the tractor 10, this connection being made in any suitable manner and represented in the drawings merely by the provision of a flexible tube 80 for connecting the cylinder 76 to this means. The piston rod 78 is pivotally connected to the bell crank arm 40 and the cylinder 76 is also pivotally connected to the cross member 48, by means of any suitable attaching bracket means 82. An inflexible link 84 is pivotally secured to the end of each of the arms 38 and to an intermediate portion of each of the uprights 70, as indicated at 86. Means conventional in such devices to prevent forward tilting of the basket as a whole is illustrated by the cable 88 secured to and between an upwardly extending portion of the frame member 12 and the transverse member 48 on the basket.

The operation of this invention will be clearly understood from the foregoing description of the mechanical details thereof, taken in connection with the above recitation of the objects sought to be achieved by this invention. In recapitulation, the operator will be provided with suitable control means, not indicated in the drawings, to control the tractor and to control the elevation of the arms 16. Other controls of any suitable nature will be provided whereby the same operator may actuate the piston rod 78 to cause the member 40, the arms 38 and the links 84 to be actuated in shifting the hinged portion of the basket to the position illustrated in Figure 1, thus unloading hay previously gathered into the basket as onto a stack. It will be understood that this unloading of the basket will be effected when the basket is in elevated position, when the device is being used in a novel manner, the device being adapted for such unloading action, however, without reference to the height to which the basket has been raised. After the unloading operation, the second set of teeth and the structure carried thereby will assume the positions illustrated in Figure 2, under the influence of gravity, and the arms 16 will then be lowered and the machine used to gather a new load of material.

Obviously many minor variations may be made in the details of construction and proportionment of the various elements of this invention, all without departure from the spirit and scope thereof. The drawings should be considered illustrative rather than limiting and this invention should be limited only in accordance with a proper interpretation of the terminology used in the subjoined claim.

Having described the invention, what is claimed as new is:

A basket construction for sweep rakes and stackers having elevating arms and power means to operate said arms, comprising a frame, a set of spaced parallel elongated teeth secured to said frame, another set of spaced parallel elongated teeth having hinged connections with the outer ends of the first set of teeth and extending along the upper sides thereof, and means to tilt the second set of teeth about said hinged connections upwardly to discharge a load carried in the basket, said frame having an upright portion disposed transversely of the teeth to comprise a back wall for the basket, said means to tilt comprising a cross member connected to each of said second mentioned teeth, a bell crank on said frame, a link between said bell crank and said cross member, and means to operate said bell crank, said last mentioned means comprising a hydraulic cylinder and piston operatively connected to said frame and to said bell crank, and operatively connected to said power means.

THOMAS J. YOUNG.
JENNINGS BRYAN RAMBO.
HAROLD N. YOUNG.

REFERENCES CITED

The following references are of record in the file of this patent:

UNITED STATES PATENTS

| Number | Name | Date |
| --- | --- | --- |
| 797,503 | Dunn | Aug. 15, 1905 |
| 1,834,822 | Boling | Dec. 1, 1931 |
| 2,136,417 | Downey | Nov. 15, 1938 |
| 2,440,010 | Hall | Apr. 20, 1948 |
| 2,451,101 | Leschinsky | Oct. 12, 1948 |